(12) United States Patent
Yue et al.

(10) Patent No.: US 11,385,494 B2
(45) Date of Patent: Jul. 12, 2022

(54) COLOR FILTER SUBSTRATE AND METHOD OF MANUFACTURING THE SAME, AND DISPLAY DEVICE

(71) Applicant: BOE TECHNOLOGY GROUP CO., LTD., Beijing (CN)

(72) Inventors: Yang Yue, Beijing (CN); Shi Shu, Beijing (CN); Chuanxiang Xu, Beijing (CN); Haitao Huang, Beijing (CN); Xiang Li, Beijing (CN); Jiangnan Lu, Beijing (CN); Qi Yao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 20 days.

(21) Appl. No.: 16/649,550

(22) PCT Filed: Sep. 12, 2019

(86) PCT No.: PCT/CN2019/105638
§ 371 (c)(1),
(2) Date: Mar. 20, 2020

(87) PCT Pub. No.: WO2020/073772
PCT Pub. Date: Apr. 16, 2020

(65) Prior Publication Data
US 2020/0409212 A1 Dec. 31, 2020

(30) Foreign Application Priority Data
Oct. 12, 2018 (CN) .......................... 201811188770.8

(51) Int. Cl.
*G02F 1/1335* (2006.01)
*G02F 1/13357* (2006.01)
*G02F 1/1333* (2006.01)

(52) U.S. Cl.
CPC .. *G02F 1/133516* (2013.01); *G02F 1/133512* (2013.01); *G02F 1/133528* (2013.01);
(Continued)

(58) Field of Classification Search
CPC ........... H01L 51/502; H01L 31/035218; H01L 51/5012; G02F 1/01791; G02F 1/133614;
(Continued)

(56) References Cited

U.S. PATENT DOCUMENTS

2003/0058391 A1* 3/2003 Hara ................. G02F 1/133555
349/113
2007/0153176 A1 7/2007 Yang et al.
(Continued)

FOREIGN PATENT DOCUMENTS

CN 1637491 A 7/2005
CN 107621723 A 1/2018
(Continued)

*Primary Examiner* — Mariam Qureshi
(74) *Attorney, Agent, or Firm* — McDermott Will & Emery LLP

(57) ABSTRACT

A color filter substrate, a manufacturing method thereof and a display device are provided. The color filter substrate includes: a base substrate; a black matrix on the base substrate, the black matrix including a plurality of openings and a bank surrounding each opening; a color filter layer in each opening; a first planarization layer covering the color filter layer, and the bank protruding relative to the first planarization layer in a direction away from the base substrate; a second planarization layer covering both the first planarization layer and the bank, the second planarization layer including a first surface distal to the base substrate; and a grating layer on the second planarization layer. The first surface of the second planarization layer includes a first portion and a second portion, an orthographic projection of the first portion on the base substrate at least partially overlaps with an orthographic projection of the plurality of (Continued)

openings on the base substrate, an orthographic projection of the second portion on the base substrate at least partially overlaps with an orthographic projection of the bank on the base substrate, and a vertical distance between the first portion and a surface of the base substrate close to the second planarization layer is greater than a vertical distance between the second portion and the surface of the base substrate close to the second planarization layer.

5 Claims, 9 Drawing Sheets

(52) U.S. Cl.
CPC .. *G02F 1/133617* (2013.01); *G02F 1/133357* (2021.01); *G02F 1/133548* (2021.01); *G02F 2202/36* (2013.01)

(58) Field of Classification Search
CPC ........... G02F 1/133617; G02F 2201/44; G02F 1/133514; G02F 1/133357; G02F 1/133548; H05B 33/00

See application file for complete search history.

(56) References Cited

U.S. PATENT DOCUMENTS

| 2009/0015769 | A1  | 1/2009  | Park |
| 2017/0104042 | A1* | 4/2017  | Wang ................... H01L 27/3283 |
| 2018/0059301 | A1* | 3/2018  | An ..................... G02F 1/133528 |
| 2018/0097192 | A1* | 4/2018  | Mishima ............. H01L 51/5092 |
| 2018/0210282 | A1* | 7/2018  | Song ........................ G02B 5/22 |
| 2018/0341147 | A1* | 11/2018 | Sugitani .............. G02F 1/13439 |
| 2019/0113800 | A1  | 4/2019  | Mou |

FOREIGN PATENT DOCUMENTS

| CN | 109300395 A  | 2/2019 |
| JP | 2017090735 A | 5/2017 |

\* cited by examiner

COLOR FILTER SUBSTRATE AND METHOD OF MANUFACTURING THE SAME, AND DISPLAY DEVICE

CROSS-REFERENCE OF RELATED APPLICATIONS

This application is a Section 371 National Stage Application of International Application No. PCT/CN2019/105638, filed on Sep. 12, 2019, entitled "COLOR FILTER SUBSTRATE AND METHOD OF MANUFACTURING THE SAME, AND DISPLAY DEVICE", which claims the benefit of Chinese Patent Application No. 201811188770.8 filed on Oct. 12, 2018 in the China National Intellectual Property Administration, the whole disclosures of each are incorporated herein by reference.

TECHNICAL FIELD

The present disclosure relates to the field of display technology, and in particular, to a color filter substrate, a method of manufacturing the color filter substrate, and a display device.

BACKGROUND

A liquid crystal display panel generally includes a color filter substrate, an array substrate, and a liquid crystal layer formed between the two substrates. The color filter substrate generally includes a black matrix. The black matrix includes a black bank and a plurality of openings surrounded by the black bank. A color filter layer is formed in the plurality of openings so that a plurality of pixel regions are formed. The color filter substrate further includes film layers such as a planarization layer, a polarizing film layer and the like provided on the black bank and the color filter layer. With the development of display technology, the polarizing film layer may be formed by an imprint lithography such as nano-imprint lithography.

SUMMARY

In one aspect, a color filter substrate is provided, including: a base substrate; a black matrix on the base substrate, the black matrix including a plurality of openings and a bank surrounding each opening; a color filter layer in each opening; a first planarization layer covering the color filter layer, and the bank protruding relative to the first planarization layer in a direction away from the base substrate; a second planarization layer covering both the first planarization layer and the bank, the second planarization layer including a first surface distal to the base substrate; and a grating layer on the second planarization layer, wherein the first surface of the second planarization layer includes a first portion and a second portion, an orthographic projection of the first portion on the base substrate at least partially overlaps with an orthographic projection of the plurality of openings on the base substrate, an orthographic projection of the second portion on the base substrate at least partially overlaps with an orthographic projection of the bank on the base substrate, and a vertical distance between the first portion and a surface of the base substrate close to the second planarization layer is greater than a vertical distance between the second portion and the surface of the base substrate close to the second planarization layer.

Optionally, the first planarization layer includes a first surface close to the second planarization layer, the bank includes a first surface close to the second planarization layer, and a material wettability of the first surface of the first planarization layer to the second planarization layer is greater than a material wettability of the first surface of the bank to the second planarization layer.

Optionally, the first surface of the first planarization layer is lyophilic, and the first surface of the bank is lyophobic.

Optionally, the orthographic projection of the first portion on the base substrate falls into the orthographic projection of the plurality of openings on the base substrate.

Optionally, the first planarization layer includes silicon dioxide.

Optionally, the bank includes a lyophobic resin.

Optionally, the vertical distance between the first portion and the surface of the base substrate close to the second planarization layer is 0.2 µm to 0.5 µm greater than the vertical distance between the second portion and the surface of the base substrate close to the second planarization layer.

Optionally, the grating layer contacts at least the first portion of the first surface of the second planarization layer.

Optionally, the grating layer includes a wire grid polarizer.

Optionally, the color filter substrate further includes a quantum dot material layer, wherein the quantum dot material layer is located in at least a part of the openings, and is located between the color filter layer and the first planarization layer.

Optionally, the color filter layer includes a red color filter layer, a green color filter layer and a blue color filter layer, and the quantum dot material layer includes a red quantum dot material layer and a green quantum dot material layer, and the red quantum dot material layer is located between the red color filter layer and the first planarization layer, and the green quantum dot material layer is located between the green color filter layer and the first planarization layers.

Optionally, the blue color filter layer directly contacts the first planarization layer.

Optionally, the color filter substrate further includes a hard mask layer, wherein the hard mask layer is located on a side of the grating layer distal to the base substrate.

Optionally, the color filter substrate further includes a third planarization layer, wherein the third planarization layer is located on a side of the grating layer distal to the base substrate and covers the grating layer.

In another aspect, a display device is provided, including the color filter substrate as described above.

In a further aspect, a method of manufacturing a color filter substrate is provided, including: providing a base substrate; forming a black matrix on the base substrate, the black matrix including a plurality of openings and a bank surrounding each opening; forming a color filter layer in the plurality of openings; forming a first planarization layer covering the color filter layer so that the bank protrudes relative to the first planarization layer in a direction away from the base substrate; forming a second planarization layer covering both the first planarization layer and the bank, the second planarization layer including a first surface distal to the base substrate; and forming a grating layer on the second planarization layer, wherein the second planarization layer includes the first surface distal to the base substrate, the first surface of the second planarization layer includes a first portion and a second portion, an orthographic projection of the first portion on the base substrate at least partially overlaps with an orthographic projection of the plurality of openings on the base substrate, an orthographic projection of the second portion on the base substrate at least partially overlaps with an orthographic projection of the bank on the base substrate, and a vertical distance between the first portion and a surface of the base substrate close to the second planarization layer is greater than a vertical distance between the second portion and the surface of the base substrate close to the second planarization layer.

Optionally, the forming the second planarization layer includes: coating a liquid film-forming material; and curing the liquid film-forming material to form the second planarization layer covering both the first planarization layer and the bank, wherein a contact angle between the liquid film-forming material and the bank is greater than a contact angle between the liquid film-forming material and the first planarization layer.

Optionally, the contact angle between the liquid film-forming material and the bank is at least 50 degrees greater than the contact angle between the liquid film-forming material and the first planarization layer.

Optionally, the method further includes: before forming the second planarization layer, performing a lyophilic treatment on the first planarization layer and/or performing a lyophobic treatment on the bank.

Optionally, the lyophilic treatment is one or more selected from a wet chemical method, an ultraviolet radiation method, or a plasma method.

Optionally, the lyophobic treatment includes a plasma method.

Optionally, the method further includes: performing an ashing treatment on the first planarization layer and the bank before forming the second planarization layer.

Optionally, the ashing treatment is performed on the first planarization layer and the bank for about 10 seconds.

Optionally, the first planarization layer includes silicon dioxide, and the bank includes a lyophobic resin.

Optionally, the forming the color filter layer includes: forming a red color filter layer, a green color filter layer, and a blue color filter layer, and the method further includes: forming a red quantum dot material layer on a side of the red color filter layer distal to the base substrate; and forming a green quantum dot material layer on a side of the green color filter layer distal to the base substrate.

Optionally, the forming the grating layer includes: forming an aluminum foil layer on a side of the second planarization layer distal to the base substrate; forming a hard mask layer on a side of the aluminum foil layer distal to the base substrate; performing a nano-imprint lithography on the hard mask layer; and etching the aluminum foil layer to form the grating layer.

BRIEF DESCRIPTION OF THE DRAWINGS

The features and advantages of the present disclosure will become more apparent by describing exemplary embodiments of the present disclosure in detail with reference to accompanying drawings.

DETAILED DESCRIPTION OF EMBODIMENTS

Figure 1:
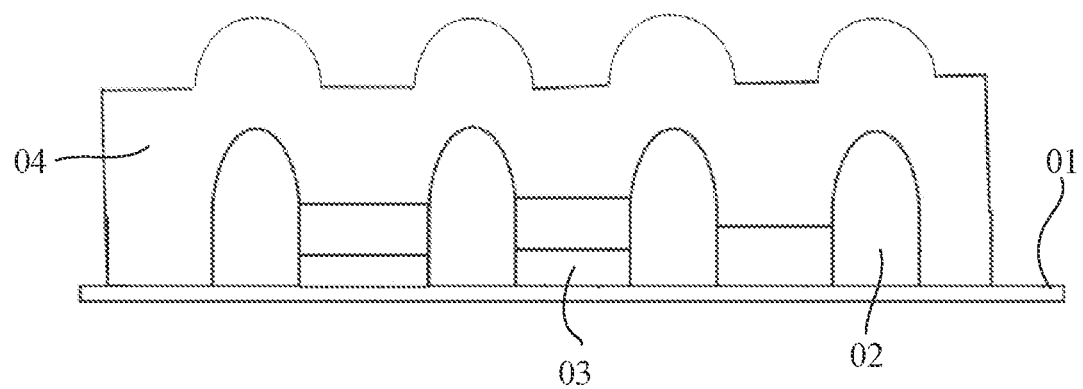
FIG. 1 is a schematic structural view of a color filter substrate in the related art.

Exemplary embodiments will be described more fully with reference to accompanying drawings. However, the exemplary embodiments may be implemented in various forms and should not be construed as being limited to the embodiments set forth herein; rather, these embodiments are provided so that the present disclosure will be thorough and complete, and will fully convey the concept of the example embodiments to those skilled in the art. In the drawings, regions and layer thicknesses are exaggerated for clarity. The same reference numerals in the drawings denote the same or similar structures, and thus their detailed descriptions will be omitted.

It should be noted that terms such as upper and lower used in the present disclosure are only relative concepts or refer to states in a process of using the product, and should not be considered to be restrictive.

In this context, an expression "material wettability" means a degree of wetting of a certain solid or a certain solid surface by a solution formed of a certain material, for example, "a material wettability of the first surface of the first planarization layer to the second planarization layer" means a degree of wetting of the first surface of the first planarization layer by a solution formed of a material contained by the second planarization layer, and "a material wettability of the first surface of the bank to the second planarization layer" means a degree of wetting of the first surface of the bank by the solution formed of the material contained by the second planarization layer. Specifically, the material of the second planarization layer in a liquid state may be coated on both the surface of the first planarization layer and the surface of the bank, and then cured. Therefore, in a manufacturing process, the "material wettability" may be characterized by a "contact angle". Those skilled in the art should understand that the contact angle is a measurement of the material wettability. If the contact angle θ is less than 90°, then the solid surface is lyophilic, that is, the solid will be easily wetted by the liquid. The smaller the contact angle is, the better the wettability is. If the contact angle θ is greater than 90°, then the solid surface is lyophobic, that is, the solid will not be easily wetted by the liquid, and it is easy for the liquid to move on the solid surface.

FIG. 1 is a schematic structural view of a color filter substrate in the related art. As shown in FIG. 1, the color filter substrate may include a base substrate 01, a black bank 02, a color filter layer 03, and a planarization layer 04. Because there is a large step between the black bank 02 and the color filter layer 03, the step could not be completely removed by the planarization layer 04 even if the planarization layer 04 is provided on the black bank 02 and the color filter layer 03. As a result, a portion of a surface of the planarization layer 04 corresponding to pixel regions (that is, a portion corresponding to the color filter layer 03) is lower than a portion of the surface of the planarization layer 04 corresponding to the black bank 02. With such a structure, it is not beneficial for forming a polarizing film layer through an imprint lithography such as nano-imprint lithography.

Figure 2A:
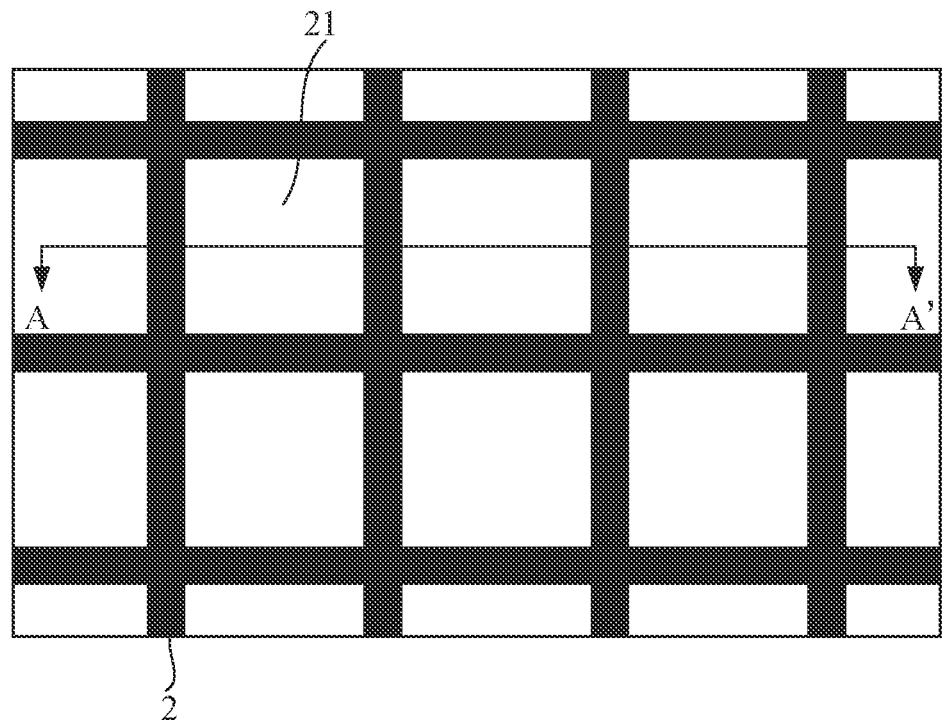
FIG. 2A is a schematic plan view of a color filter substrate according to some embodiments of the present disclosure.
Figure 2B:
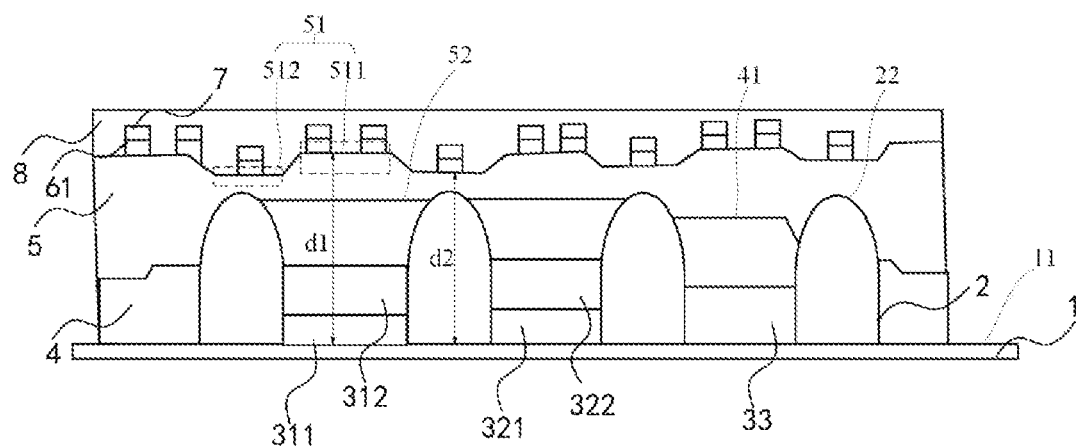
FIG. 2B is a cross-sectional view of a color filter substrate according to some embodiments of the present disclosure taken along line AA' in FIG. 2A.

FIG. 2A is a schematic plan view of a color filter substrate according to some embodiments of the present disclosure, and FIG. 2B is a cross-sectional view of the color filter substrate according to some embodiments of the present disclosure, taken along line AA' in FIG. 2A. As shown in FIG. 2A and FIG. 2B, the color filter substrate according to some embodiments of the present disclosure may include a base substrate 1, a black matrix, a color filter layer, a first planarization layer 4, a second planarization layer 5, a grating layer 61, and a third planarization layer 8.

The black matrix is formed on the base substrate 1, and it may include a plurality of openings 21 and a bank 2 surrounding each of the openings 21. Each opening 21 corresponds to a pixel region, that is, the bank 2 defines a plurality of pixel regions. For example, the bank 2 may include a black dye, so that crosstalk between sub-pixels of different colors may be effectively prevented, and the contrast ratio of the display device may be improved.

The color filter layer may include a red color filter layer 311, a green color filter layer 321, and a blue color filter layer 33. For example, the red color filter layer 311 may be a red organic resin color filter layer, the green color filter layer 321 may be a green organic resin color filter layer, and the blue color filter layer 33 may be a blue organic resin color filter layer. The red color filter layer 311, the green color filter layer 321, and the blue color filter layer 33 are respectively formed in the openings 21 of the black matrix to form a red pixel region, a green pixel region, and a blue pixel region, respectively.

Optionally, the color filter substrate according to the embodiments of the present disclosure may further include a quantum dot material layer. As an example, the quantum dot material layer may include a red quantum dot material layer 312 and a green quantum dot material layer 322. As shown in FIG. 2B, the red quantum dot material layer 312 and the green quantum dot material layer 322 are formed in the openings of the red pixel regions and the openings of the green pixel regions, respectively. The red quantum dot material layer 312 is located on a side of the red color filter layer 311 distal to the base substrate 1, and the green quantum dot material layer 322 is located on a side of the green color filter layer 321 distal to the base substrate 1. Optionally, the quantum dot material layer does not include a blue quantum dot material layer, that is, no blue quantum dot material layer is provided on a side of the blue color filter layer 33 distal to the base substrate 1.

As shown in FIG. 2B, there is a difference in thickness (also referred to as height in FIG. 2B) between the bank 2 and the color filter layer or the quantum dot material layer, so that a step is formed between the bank 2 and the color filter layer or the quantum dot material layer.

It should be understood that the thicknesses of various color filter layers and various quantum dot material layers included in the color filter layer may be adjusted according to actual needs, and are not particularly limited in the embodiments of the present disclosure.

With continued reference to FIG. 2B, the first planarization layer 4 covers the color filter layer and/or the quantum dot material layer. In the illustrated embodiment, the first planarization layer 4 is disposed on surfaces of the quantum dot material layers 312, 322 and of the blue color filter layer 33 distal to the base substrate 1. For example, the first planarization layer 4 contacts the surfaces of the quantum dot material layers 312, 322 and of the blue color filter layer 33 distal to the base substrate 1.

As shown in FIG. 2B, the bank 2 is exposed from the first planarization layer 4. That is, the bank 2 protrudes relative to the first planarization layer 4 in a direction away from the base substrate 1. Specifically, the bank 2 includes a first surface 22 distal to the base substrate 1, the first planarization layer 4 includes a first surface 41 distal to the base substrate 1, and the first surface 22 of the bank 2 is further away from the base substrate 1 relative to the first surface 41 of the first planarization layer 4.

With continued reference to FIG. 2B, the second planarization layer 5 covers both the first planarization layer 4 and the bank 2. The second planarization layer 5 includes a first surface 51 distal to the base substrate 1 and a second surface 52 close to the base substrate 1. The second surface 52 of the second planarization layer 5 contacts the first surface 22 of the bank 2 and the first surface 41 of the first planarization layer 4. As shown in FIG. 2B, the first surface 51 of the second planarization layer 5 has a concave-convex structure. Specifically, the first surface 51 of the second planarization layer 5 includes a first portion 511 and a second portion 512 (shown schematically by dashed boxes in FIG. 2B). The first portion 511 is farther away from the base substrate 1 than the second portion 512. More specifically, the base substrate 1 includes a surface 11 (upper surface in FIG. 2B) close to the second planarization layer 5. A vertical distance (distance d1 in FIG. 2B) between the first portion 511 of the first surface 51 of the second planarization layer 5 and the surface 11 of the base substrate 1 is greater than the a vertical distance (distance d2 in FIG. 2B) between the second portion 512 of the first surface 51 of the second planarization layer 5 and the surface 11 of the base substrate 1. For example, an orthographic projection of the first portion 511 on the base substrate 1 overlaps with an orthographic projection of the plurality of openings 21 on the base substrate 1, and an orthographic projection of the second portion 512 on the base substrate 1 overlaps with an orthographic projection of the bank 2 on the base substrate 1. For example, the orthographic projection of the first portion 511 on the base substrate 1 falls into the orthographic projection of the plurality of openings 21 on the base substrate 1. For another example, the orthographic projection of the first portion 511 on the base substrate 1 coincides with the orthographic projection of the plurality of openings 21 on the base substrate 1, and the orthographic projection of the second portion 512 on the base substrate 1 coincides with the orthographic projection of the bank 2 on the base substrate 1. In this way, a portion of the first surface 51 of the second planarization layer 5 corresponding to the pixel regions is higher than (that is, farther away from the base substrate 1 than) a portion of the first surface 51 corresponding to the bank 2, thereby eliminating the aforementioned step between the bank 2 and the color filter layer or the quantum dot material layer in the pixel regions.

The grating layer 61 is located on a side of the second planarization layer 5 distal to the base substrate 1. Specifically, the grating layer 6 is directly located on or in contact with the surface (i.e., the first surface 51) of the second planarization layer 5 distal to the base substrate 1. For example, the grating layer 6 may be formed on the first surface 51 by an imprint lithography such as nano-imprint lithography. Since the first portion 511 of the first surface 51 of the second planarization layer 5 is higher than the second portion 512, it is beneficial to form, in the imprint lithography, a complete grating structure on the first portion 511 of the first surface 51 corresponding to the pixel regions, thereby improving a performance of the color filter substrate.

In the embodiments of the present disclosure, the material wettability of the first surface 41 of the first planarization layer 4 to the second planarization layer 5 is greater than the material wettability of the first surface 22 of the bank 2 to the second planarization layer 5. For example, the first surface 41 of the first planarization layer 4 may be lyophilic, and the first surface 22 of the bank 2 may be lyophobic. In the embodiments of the present disclosure, during a process of forming the second planarization layer 5, a liquid film-forming material may be coated on both the first surface 41 of the first planarization layer 4 and the first surface 22 of the bank 2. Then the liquid film-forming material is cured to form the second planarization layer 5. The contact angle between the liquid film-forming material and the bank 2 (particularly its first surface 22) is greater than the contact angle between the liquid film-forming material and the first planarizing layer 4 (particularly its first surface 41). In this way, under the control of a surface tension to which the liquid film-forming material is subjected, the first surface 51 of the second planarization layer 5 will form a concave-convex structure as shown in FIG. 2B, that is, a vertical distance (distance d1 in FIG. 2B) between the first portion 511 of the first surface 51 of the second planarization layer 5 and the surface 11 of the base substrate 1 shall be greater than a vertical distance (distance d2 in FIG. 2B) between the second portion 512 of the first surface 51 of the second planarization layer 5 and the surface 11 of the base substrate 1.

For example, the vertical distance (the distance d1 in FIG. 2B) between the first portion 511 of the first surface 51 of the second planarization layer 5 and the surface 11 of the base substrate 1 is 0.2 to 0.5 μm greater than the vertical distance (the distance d2 in FIG. 2B) between the second portion 512 of the first surface 51 of the second planarization layer 5 and the surface 11 of the base substrate 1. In one example, as shown in FIG. 2B, a vertical distance between the first portion 511 of the first surface 51 of the second planarization layer 5 and the first surface 41 of the first planarization layer 4 may be about 4.2 μm. A vertical distance between the second portion 512 of the first surface 51 of the second planarization layer 5 and the first surface 41 of the first planarization layer 4 may be about 3.9 μm. Thus, the distance d1 is about 0.3 μm greater than the distance d2.

In the embodiments of the present disclosure, each of the first planarization layer 4 and the second planarization layer 5 may include an organic material. For example, the second planarization layer 5 may include a material selected from epoxy resin, PMMA, or phenolic resin. The first planarization layer 4 may include a material selected from epoxy resin, PMMA, or phenolic resin. Based on this, the first planarization layer 4 may further include silicon dioxide to improve its lyophilic property. The bank 2 may include a lyophobic resin material such as polymethacrylate or fluorene resin. Alternatively or additionally, the first surface 41 of the first planarization layer 4 may be subjected to a lyophilic treatment, and/or the first surface 22 of the bank 2 may be subjected to a lyophobic treatment, and methods for the lyophilic treatment and the lyophobic treatment will be described in more detail below.

With continued reference to FIG. 2B, the grating layer 61 is formed on at least the first portion 511 of the first surface 51 of the second planarization layer 5. Specifically, the grating layer 61 contacts at least the first portion 511 of the first surface 51 of the second planarization layer 5. That is, the grating layer 61 is formed at least in the pixel regions of the color filter substrate. For example, the grating layer 61 may be a wire grid polarizer (abbreviated as WGP). For example, the grating layer 61 may be a transmission grating.

Optionally, the color filter substrate may further include a hard mask layer 7. The hard mask layer 7 is located on a side of the grating layer 61 distal to the base substrate 1, and the hard mask layer 7 has the same pattern as the grating layer 61.

For example, a material of the hard mask layer 7 may include silicon dioxide, and a material of the grating layer 61 may include aluminum.

With continued reference to FIG. 2B, the third planarization layer 8 is located on a side of the grating layer 61 and/or the hard mask layer 7 distal to the base substrate 1, and covers the grating layer 61 and/or the hard mask layer 7. The material of the third planarization layer 8 may be the same as or different from the material of the second planarization layer 5, which is not particularly limited in the embodiments of the present disclosure.

Optionally, some embodiments of the present disclosure further provide a display device, which may include the above-mentioned color filter substrate. The display device may be any products or components having a display function, such as a mobile phone, a tablet computer, a television, a display, a notebook computer, a digital photo frame, a navigator, or the like.

Figure 3:
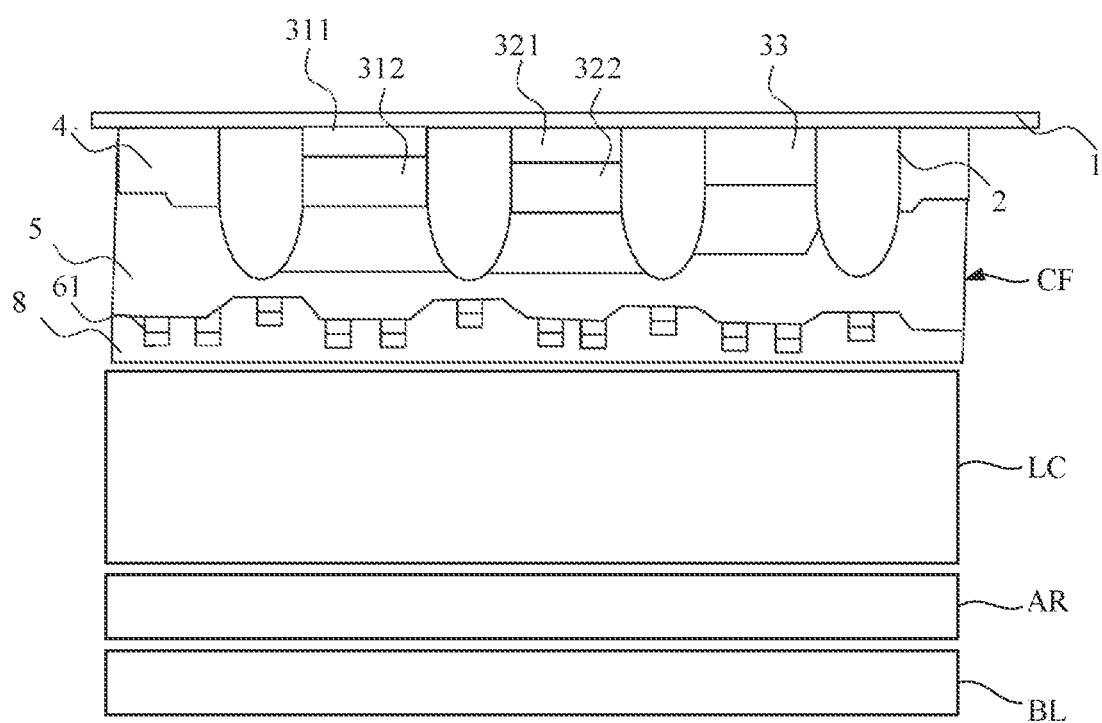
FIG. 3 is a schematic structural view of a display device according to some embodiments of the present disclosure.

As shown in FIG. 3, the display device according to some embodiments of the present disclosure may include a backlight source BL, an array substrate AR, a color filter substrate CF, and a liquid crystal layer LC. The color filter substrate CF may be the color filter substrate according to any one of the above embodiments. The backlight source BL is located on a side of the array substrate AR distal to the color filter substrate CF, and the liquid crystal layer LC is located between the array substrate AR and the color filter substrate CF. For example, the backlight source BL may be a backlight source providing blue light, for example, it may include LEDs emitting blue light. With reference to FIG. 2B and FIG. 3, in the red pixel region, the blue light is irradiated on the red quantum dot material layer. The red quantum dot material layer is excited by the blue light to emit red light, and the red light is emitted through the red color filter layer. In the green pixel region, the blue light is irradiated on the green quantum dot material layer, the green quantum dot material layer is excited by the blue light to emit green light, and the green light is emitted through the green color filter layer. In the blue pixel region, the blue light is directly emitted through the blue color filter layer. By providing the quantum dot material layer and the color filter layer, the display device is capable of realizing a color gamut of 120% NTSC. Therefore, the display device according to the embodiments of the present disclosure has advantages of strong color reduction capability and high color gamut.

It should be understood that the array substrate AR may be provided with elements such as a common electrode, a pixel electrode, and a lower polarizer. For specific structures, reference may be made to the structure of the array substrate in the related art, and details are not described herein again.

Figure 4A:
FIG. 4A to FIG. 4J are schematic views of processes of a method of manufacturing a color filter substrate according to some exemplary embodiments of the present disclosure.

Optionally, the embodiments of the present disclosure also provide a method of manufacturing a color filter substrate, and the color filter substrate may be manufactured through processes shown in FIGS. 4A-3J.

Figure 4B:
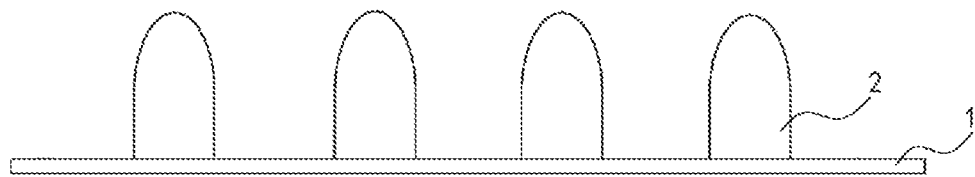

First, referring to FIG. 4A, a base substrate 1 is provided. Referring to FIG. 4B, a black matrix is formed on the base substrate 1. The black matrix includes a plurality of openings 21 and a bank 2 surrounding each opening. For example, the bank 2 includes black dye, and more specifically, the bank 2 may include a black material formed of a lyophobic resin material such as polymethacrylate or fluorene resin.

Figure 4C:
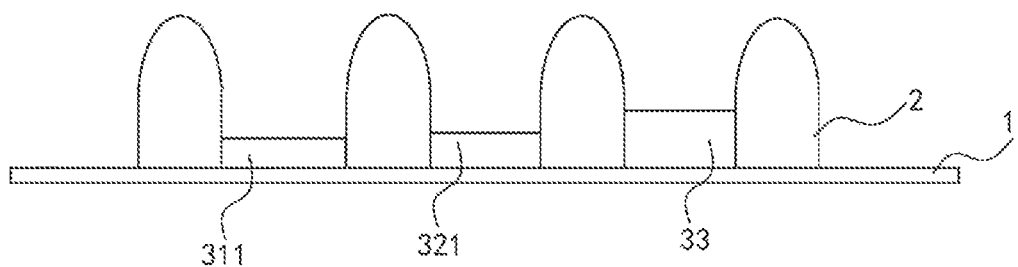

Then, referring to FIG. 4C, a color filter layer is formed in each opening of the black matrix. Specifically, a red color filter layer 311, a green color filter layer 312, and a blue color filter layer 33 are formed, respectively. For example, the red color filter layer 311 may be a red organic resin color filter layer, the green color filter layer 321 may be a green organic resin color filter layer, and the blue color filter layer 33 may be a blue organic resin color filter layer. The red color filter layer 311, the green color filter layer 321, and the blue color filter layer 33 are respectively formed in the openings 21 of the black matrix to form a red pixel region, a green pixel region, and a blue pixel region, respectively.

Figure 4D:
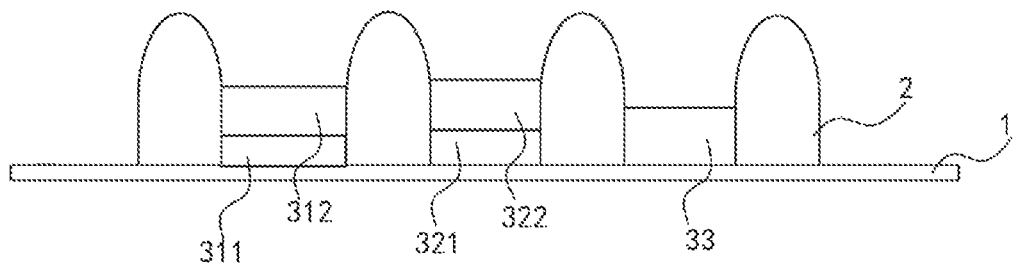

Optionally, referring to FIG. 4D, a quantum dot material layer is formed on the color filter layer accordingly. For example, a red quantum dot material layer 312 is formed on the red color filter layer 311, and a green quantum dot material layer 322 is formed on the green color filter layer 312. Optionally, no blue quantum dot material layer is formed on the blue color filter layer 33.

Figure 4E:
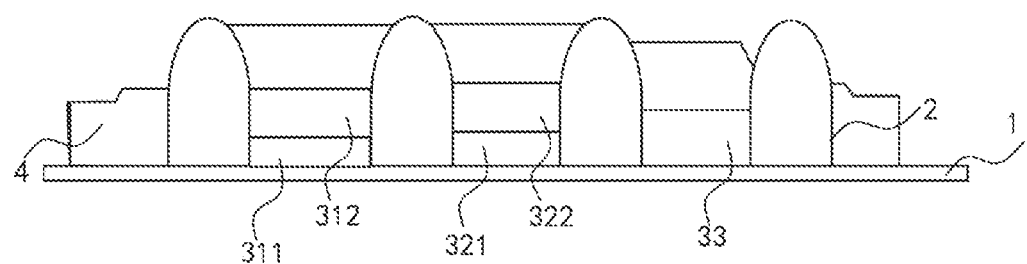

After that, referring to FIGS. 2B and 4E, a first planarization layer 4 is formed, so that the first planarization layer 4 covers the quantum dot material layers 312, 322 and the blue color filter layer 33, and the bank 2 protrudes relative to the first planarization layer 4, that is, the bank 2 protrudes in a direction away from the base substrate 1 relative to the first planarization layer 4. Specifically, the bank 2 includes a first surface 22 distal to the base substrate 1, the first planarization layer 4 includes a first surface 41 distal to the base substrate 1, and the first surface 22 of the bank 2 is further away from the base substrate 1 than the first surface 41 of the first planarization layer 4. For example, a liquid film-forming material may be coated, and then the liquid film-forming material is cured to form the first planarization layer 4.

Figure 4F:
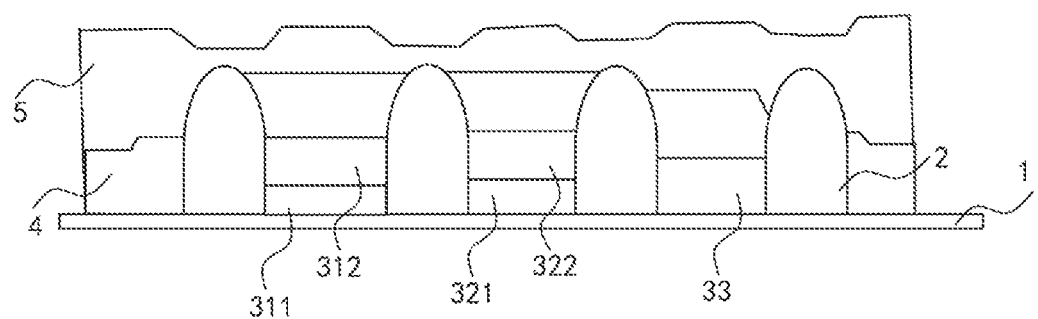

Then, referring to FIGS. 2B and 4F, a liquid film-forming material is coated, and then the liquid film-forming material is cured to form a second planarization layer 5 covering both the first planarization layer 4 and the bank 2. Optionally, the liquid film-forming material used to form the second planarization layer 5 may be the same as or different from the liquid film-forming material used to form the first planarization layer 4.

In this step, the contact angle between the coated liquid film-forming material forming the second planarization layer 5 and the bank 2 is greater than the contact angle between the liquid film-forming material and the first planarization layer 4. Therefore, under the control of the surface tension to which the liquid film-forming material is subjected, the first surface 51 of the second planarization layer 5 will form a concave-convex structure as shown in FIG. 2B and FIG. 4F, that is, the vertical distance (the distance d1 in FIG. 2B) between the first portion 511 of the first surface 51 of the second planarization layer 5 and the surface 11 of the base substrate 1 is greater than the vertical distance (the distance d2 in FIG. 2B) between the second portion 512 of the first surface 51 of the second planarization layer 5 and the surface 11 of the base substrate 1. In this way, a portion of the first surface 51 of the second planarization layer 5 corresponding to the pixel regions is higher than (that is, farther away from the base substrate 1) a portion of the first surface 51 corresponding to the bank 2, thereby eliminating the step between the bank 2 and the color filter layer or the quantum dot material layer in the pixel regions. In this way, it is beneficial to forming a complete grating structure on the first portion 511 of the first surface 51 corresponding to the pixel regions.

In the embodiments of the present disclosure, the contact angle between the liquid film-forming material forming the second planarization layer 5 and the bank 2 is greater than the contact angle between the liquid film-forming material and the first planarization layer 4, so that a height of the portion of the second planarization layer corresponding to the pixel regions is greater than a height of the portion of the second planarization layer corresponding to the bank 2. For example, the contact angle between the liquid film-forming material forming the second planarization layer 5 and the bank 2 is at least 50 degrees greater than the contact angle between the liquid film-forming material and the first planarization layer 4.

Optionally, in order to achieve that the contact angle between the liquid film-forming material of the second planarization layer 5 and the bank 2 is greater than the contact angle between the liquid film-forming material and the first planarization layer 4, the first planarization layer 4 may be subjected to a lyophilic treatment, and/or the bank 2 may be subjected to a lyophobic treatment. For example, the lyophilic treatment may be one or more selected from a wet chemical method, an ultraviolet radiation method, or a plasma method. In the wet chemical method, the first planarization layer 4 may be processed by a solution such as, but not limited to, chromic acid, potassium permanganate, and sulfuric acid, so that oxygen groups such as carboxyl (—COOH), hydroxyl (—OH) and the like are formed on the first surface 41 of the first planarization layer 4. In the ultraviolet radiation method, the first surface 41 of the first planarization layer 4 may be irradiated with ultraviolet light, so that active groups or dangling bonds are generated on the first surface 41, and then the first surface 41 of the first planarization layer 4 is exposed to gas so that functional groups are generated on the first surface 41, thereby improving lyophilic property. In the plasma method, energy particles and active groups in the plasma may interact with the first surface 41 of the first planarization layer 4 to change surface composition, thereby improving the lyophilic property of the surface. It should be understood that an appropriate method may be selected according to the material of the first planarization layer 4 to improve the lyophilic property of the surface thereof. For example, in the lyophobic treatment, a lyophobic property of the bank 2 may be improved by a plasma method. It should be understood that an appropriate plasma may be selected according to the material of the bank 2 to improve the lyophobic property of the surface of the bank 2. It should be noted that the lyophilic treatment to the first planarization layer 4 and the lyophobic treatment to the bank 2 may be performed concurrently or alternatively, as long as it is obtained that the contact angle between the liquid film-forming material of the second planarization layer 5 and the bank 2 is larger than the contact angle between the liquid film-forming material and the first planarization layer 4. Moreover, the lyophilic treatment and the lyophobic treatment are not limited to the methods described above.

Figure 5:
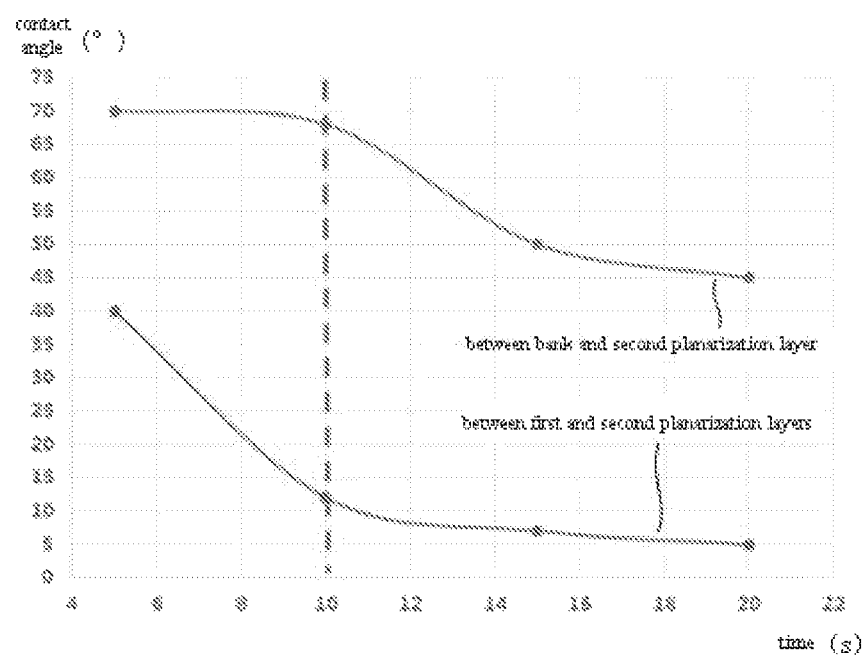
FIG. 5 shows a schematic curve diagram of contact angles after an ashing treatment.

Optionally, in order to achieve that the contact angle between the liquid film-forming material of the second planarization layer 5 and the bank 2 is greater than the contact angle between the liquid film-forming material and the first planarization layer 4, the first planarization layer 4 and the bank 2 are subjected to an ashing treatment. The inventors have found through experiments that the contact angle between the liquid film-forming material of the second planarization layer 5 and the bank 2 may be greater than the contact angle between the liquid film-forming material and the first planarization layer 4 by performing the ashing treatment on the first planarization layer 4 and the bank 2. FIG. 5 shows a schematic curve diagram of the contact angle after the ashing treatment is performed. In FIG. 5, the abscissa indicates the time for performing the ashing treatment on the first planarization layer 4 and the bank 2, and the unit thereof is second (s); the ordinate indicates a magnitude of the contact angle, and the unit thereof is degree (°). The upper curve is a graph of the contact angle between the liquid film-forming material of the second planarization layer 5 and the bank 2, and the lower curve is a graph of the contact angle between the liquid film-forming material of the second planarization layer 5 and the first planarization layer 4. As shown in FIG. 5, after the ashing treatment is performed on the first planarization layer 4 and the bank 2, the contact angle between the liquid film-forming material of the second planarization layer 5 and the bank 2 is greater than the contact angle between the liquid film-forming material and the first planarization layer 4. For example, if the ashing treatment which is performed on the first planarization layer 4 and the bank 2 lasts for about 10 seconds, a difference between the contact angle between the liquid film-forming material of the second planarization layer 5 and the bank 2 and the contact angle between the liquid film-forming material and the first planarization layer 4 substantially reaches a maximum value.

Optionally, in order to achieve that the contact angle between the liquid film-forming material of the second planarizing layer 5 and the bank 2 is greater than the contact angle between the liquid film-forming material and the first planarizing layer 4, the first planarization layer 4 and the bank 2 may be formed of different materials. For example, the liquid film-forming material forming the first planarization layer 4 may include silicon dioxide. In this way, the formed first planarization layer 4 includes silicon dioxide to improve its lyophilic property. As another example, the bank 2 may be formed of the lyophobic resin material such as polymethacrylate or fluorene resin.

It should be noted that each of the foregoing methods may be used alone or in combination. For example, the lyophilic material may be selected to form the first planarization layer 4, and the lyophobic material may be selected to form the bank 2, while the first planarization layer 4 may be subjected to the lyophilic treatment and the bank 2 may be subjected to the lyophobic treatment.

In the embodiments of the present disclosure, after the second planarization layer 5 is formed, a grating layer may be further formed on the second planarization layer 5.

Figure 4G:
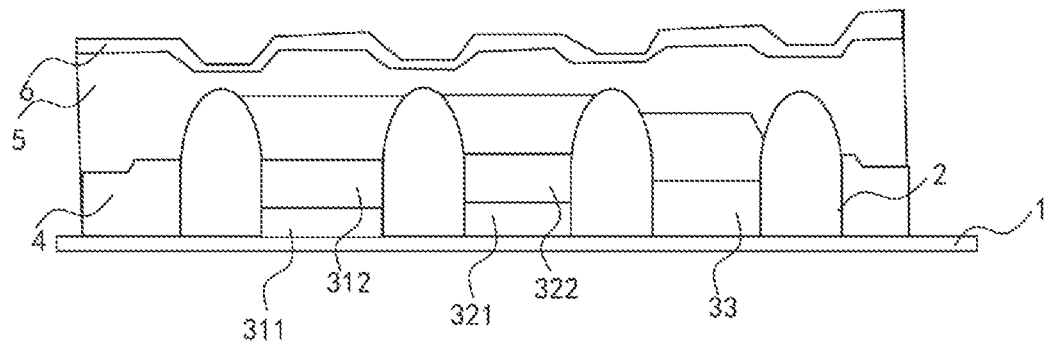

For example, referring to FIG. 4G, an aluminum foil layer 6 may be formed on the second planarization layer 5.

Figure 4H:
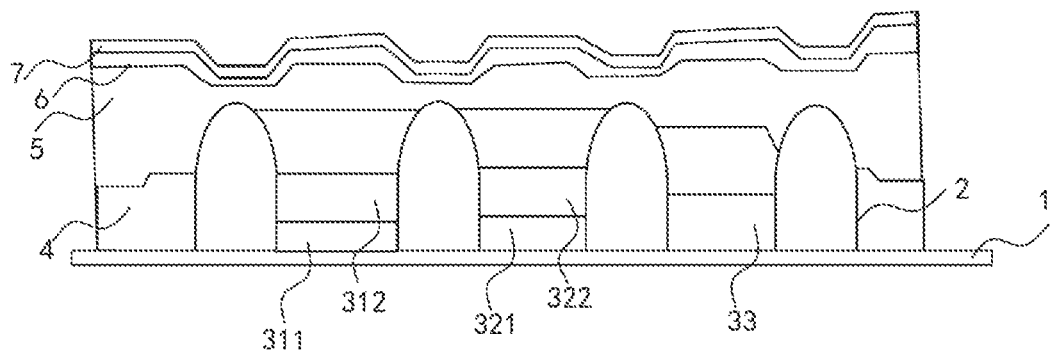

Referring to FIG. 4H, a hard mask layer 7 may be formed on the aluminum foil layer 6.

Figure 4I:
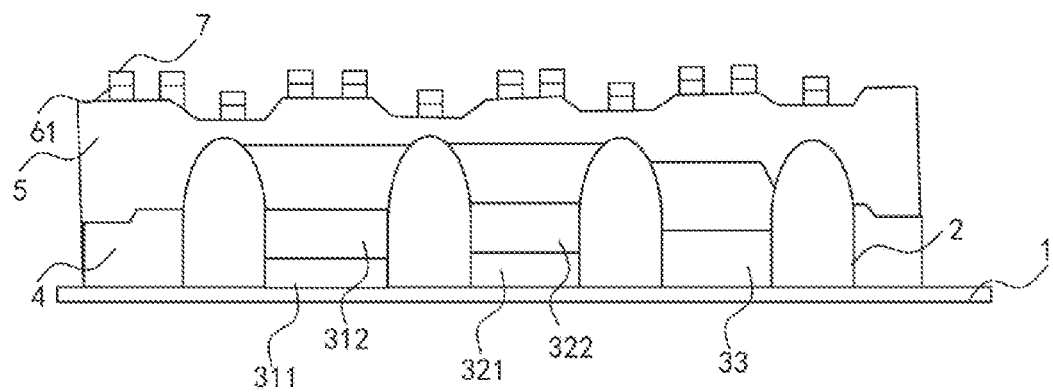

Next, referring to FIG. 4I, a nano-imprint lithography may be performed on the hard mask layer 7, and the grating layer 61 may be formed by an inductive coupled plasma (abbreviated as ICP) etching process, and a part of the hard mask layer 7 which is not etched away is left on the grating layer 61. By providing the hard mask layer 7, it is advantageous for the nano-imprint lithography to form a desired grating pattern.

In the embodiments of the present disclosure, the first surface 51 of the second planarization layer 5 has a concave-convex structure, specifically, the first portion 511 of the first surface 51 of the second planarization layer 5 is higher than the second portion 512, thus in the imprint lithography, a part of the hard mask layer 7 corresponding to the pixel regions may be more easily imprinted by an imprint template, thereby facilitating forming a complete grating structure on the first portion 511 of the first surface 51 corresponding to the pixel regions. In this way, it is conducive to improving the performance of the color filter substrate. Moreover, since the bank 2 is not used as a pixel region, an integrity of the grating structure is not highly required at a portion corresponding to the bank 2. That is, the portion of the second planarization layer 5 corresponding to the pixel regions is formed into the "convex" structure, thereby facilitating forming a complete grating structure at the portion, and also, the portion of the second planarization layer 5 corresponding to the bank 2 is formed into the "concave" structure, so that it does not adversely affect the performance of the color filter substrate.

Figure 4J:
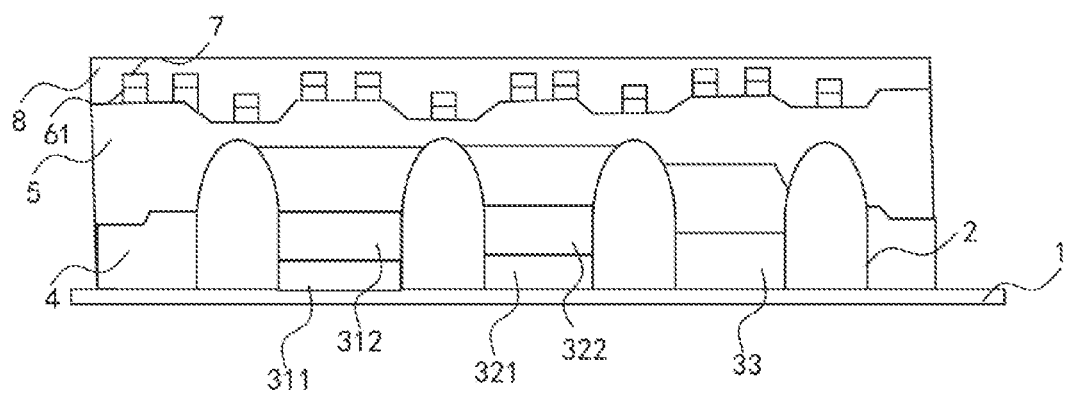

Finally, referring to FIG. 4J, a third planarization layer 8 may be formed to cover the grating layer 61 and the hard mask layer 7.

In the embodiments of the present disclosure, by adding the first planarization layer 4 and adjusting the difference between the contact angle between the liquid film-forming material of the second planarization layer 5 and the bank 2 and the contact angle between the liquid film-forming material of the second planarization layer 5 and the first planarization layer 4, the second planarization layer having the "convex" structure corresponding to the pixel regions and the "concave" structure corresponding to the bank may be obtained. In this way, a complete nano-grating may be formed in the portion corresponding to the pixel regions, thereby facilitating improving the performance of the color filter substrate.

It should be noted that, in the above embodiments, the color filter substrate and the display device have been described by taking the transmission grating as an example of the grating. Those skilled in the art may understand that the grating may also be a reflective grating, that is, the inventive concept of the present disclosure may also be applied to form the reflective grating. Similarly, by adding a planarization layer, and using the difference between a contact angle between an upper planarization layer and a lower planarization layer and a contact angle between the upper planarization layer and the bank, the upper planarization layer includes a concave-convex surface in which the portion corresponding to the pixel regions is convex and the portion corresponding to the bank is concave, so that a complete grating structure may be formed on the portion corresponding to the pixel regions during the nano-imprint lithography.

Of course, the present disclosure may also include various other embodiments. Without departing from the spirit and essence of the present disclosure, those skilled in the art may make various corresponding changes and modifications according to the embodiments of the present disclosure, and these corresponding changes and modifications should fall within the scope of appending claims.

What is claimed is:

1. A method of manufacturing a color filter substrate, comprising:
   providing a base substrate;
   forming a black matrix on the base substrate, the black matrix comprising a plurality of openings and a bank surrounding each opening;
   forming a color filter layer in the plurality of openings;
   forming a first planarization layer covering the color filter layer so that the bank protrudes relative to the first planarization layer in a direction away from the base substrate;
   forming a second planarization layer covering both the first planarization layer and the bank, the second planarization layer comprising a first surface distal to the base substrate; and
   forming a grating layer on the second planarization layer, wherein the first surface of the second planarization layer comprises a first portion and a second portion, an orthographic projection of the first portion on the base substrate at least partially overlaps with an orthographic projection of the plurality of openings on the base substrate, an orthographic projection of the second portion on the base substrate at least partially overlaps with an orthographic projection of the bank on the base substrate, and a vertical distance between the first portion and a surface of the base substrate close to the second planarization layer is greater than a vertical distance between the second portion and the surface of the base substrate close to the second planarization layer, and wherein the forming the second planarization layer comprises:
coating a liquid film-forming material; and
curing the liquid film-forming material to form the second planarization layer covering both the first planarization layer and the bank,
wherein a contact angle between the liquid film-forming material and the bank is greater than a contact angle between the liquid film-forming material and the first planarization layer.

2. The method according to claim 1, further comprising: before forming the second planarization layer, performing a lyophilic treatment on the first planarization layer and/or performing a lyophobic treatment on the bank.

3. The method according to claim 1, further comprising: performing an ashing treatment on the first planarization layer and the bank before forming the second planarization layer.

4. The method according to claim 1, wherein the forming the color filter layer comprises: forming a red color filter layer, a green color filter layer, and a blue color filter layer, and the method further comprises: forming a red quantum dot material layer on a side of the red color filter layer distal to the base substrate; and forming a green quantum dot material layer on a side of the green color filter layer distal to the base substrate.

5. The method according to claim 1, wherein the forming the grating layer comprises:
forming an aluminum foil layer on a side of the second planarization layer distal to the base substrate;
forming a hard mask layer on a side of the aluminum foil layer distal to the base substrate;
performing a nano-imprint lithography on the hard mask layer; and
etching the aluminum foil layer to form the grating layer.

* * * * *